Feb. 13, 1940.   J. D. MORGAN ET AL   2,190,135
SOLDER MELTING POT
Filed July 17, 1936
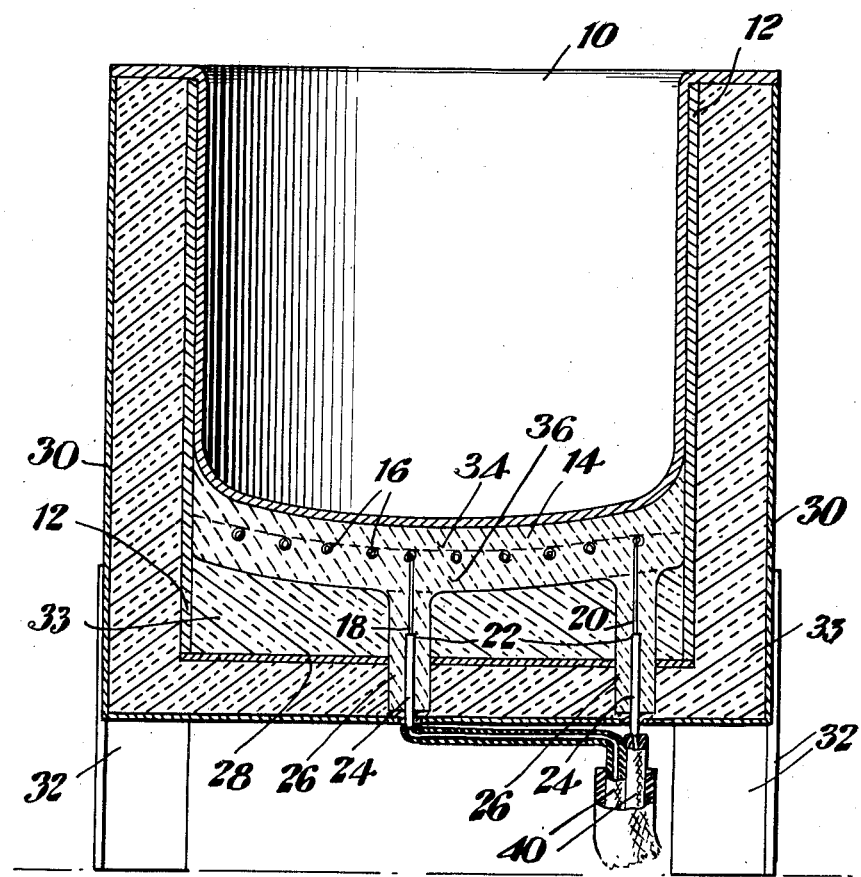
INVENTORS
JOHN D. MORGAN
BY RUSSELL E. LOWE
ATTORNEY Patented Feb. 13, 1940

2,190,135

UNITED STATES PATENT OFFICE 2,190,135

SOLDER MELTING POT

John D. Morgan, South Orange, N. J., and Russell E. Lowe, New York, N. Y., assignors to Power Patents Company, Hillside, N. J., a corporation of Maine Application July 17, 1936, Serial No. 91,137

3 Claims. (Cl. 219—44)

This invention relates generally to electric heating apparatus and is more particularly directed to an improved solder melting pot having an electric heater attachment and process of making same.

Among the objects of the present invention are: to provide an improved solder melting pot and electric heating element therefor; to provide an electric heating element for a metal pot in which the electric resistor filament is embedded in a dielectric refractory body of high thermal conductivity mounted immediately beneath the bottom of the pot and supporting the filament in spaced electrically insulated relation thereto; to provide a process for assembling a solder melting pot and an electric heater attachment therefor whereby the heating element is cast in place into a unitary bonded structure with the pot, without adverse effect on the strength or electrical conductivity of the fragile resistor filament; to provide an improved method for forming a mechanically strong and highly heat conductant junction between an end of a fragile electric resistor filament and a metal terminal post.

With the aforementioned objects and other objects and features in view, the invention consists in the improved solder melting pot and process of manufacturing same which is hereinafter described and particularly defined by the accompanying claims.

The invention will be hereinafter more particularly described by reference to the accompanying drawing which illustrates in a vertical sectional view a solder melting pot incorporating the invention which forms the subject of the present application.

Referring to the drawing, it will be seen that the principal parts of the solder melting pot therein illustrated include a steel pot 10, to the outer peripheral wall of which there is affixed a cylindrical sheet metal skirt 12. The lower end of the skirt 12 extends a considerable distance below the bottom of pot 10, and between the inner walls of the skirt 12, and affixed thereto as well as to the bottom of the pot 10, is an electrical resistor heating element 14. Heating element 14 is made up of a coil of high temperature resistant alloy metal filament 16 embedded in a highly heat conductant dielectric body of refractory. The two ends 18—20, of the filament 16, are illustrated as extending downwardly a short distance below the resistor 14 and as being connected by fused metal joints 22 to metal terminal posts 24. Each of the junctions 22 between the filament ends 18 and 20 and the posts 24 is provided with a protective highly heat conductant sleeve 26 comprising a cylinder of thermally conductive dielectric refractory cast in place around the joint and that portion of the filament ends 18—20 and terminal posts 24 contiguous to the joint. The solder melting pot illustrated also includes a metal plate 28 forming a closure for the lower end of skirt 12, and a sheet metal casing 30 having supporting legs 32. The spaces between casing 30 and skirt 12, and between the bottom of the casing and the resistor 14 are filled with heat insulating material 33 such as magnesia or magnesia-asbestos mixture.

In assembling the pot which is illustrated in the drawing, the first step is to turn the pot 10 upside down and to attach thereto by spot weld the sheet metal skirt 12 having an inner periphery dimensioned to tightly fit the outer periphery of the side walls of pot 10. The next step is to build up a layer 34 of a plastic mixture of refractory material on the bottom of pot 12 in the manner indicated, and to allow this layer to harden. A preferred refractory for this purpose is the zircon-ferro-silicon refractory which is described in our copending application Serial No. 87,662, filed June 27th, 1936, for High temperature refractory. This refractory is best prepared by admixing 40 to 50 parts by weight of milled grain zircon (through 300 mesh) with 50 to 60 parts of silicon or 75%–85% ferro-silicon (through 80 mesh) and not substantially more than one part of aluminum hydrate (through 100 mesh). The aforesaid mixture is prepared for spreading on the base of the pot by wetting to the proper consistency with water and with 85% orthophosphoric acid employed as a binding agent in the proportions of about 6 cc. per 100 grams of the silicon-zircon-aluminum hydrate mixture. After applying the layer 34 of the plastic mixture of refractory material in a dampened state, it is air dried and the metal filament 16 is then laid on the layer 34 in the form of a helical coil. The coil should be previously laid out in loops and shaped to the curvature of the exposed surface of layer 34 and set so as to prevent short circuiting between successive loops of the coil, by an annealing operation. The preferred material for the coil 16 is chromium (about 35%)-iron-aluminum (about 7%) alloy wire which will stand up under temperatures of the order of 2300° F. 20 gauge wire is a suitable size for the filament. After placing the coil 16, another layer 36 of the same type of thermally conductant electrically non-conductant refractory mixture is built up on the layer 34, thus embedding the coil in the refractory resistor 14 of approximately the shape indicated. The free ends 18 and 20 of the resistor filament are then attached to heavy metal terminal posts 24 by a high temperature arc fusion or welding operation to form the fused metal joints 22. Suitable molds are then inserted over the posts 24 and the high temperature refractory sleeves 26 are formed by pouring these molds full of a plastic mixture of phosphoric acid and zircon-silicon refractory material, and allowing the mixture to air dry.

After casting and air drying the resistor 14 and terminal elements 26 in the manner described, the pot is placed in a baking oven and baked to a temperature of about 1200° F. The space between the resistor heating element 14 and the bottom edge of the skirt 12, is then filled with magnesia or other insulating material, and the plate 28 is spot welded to the bottom edge of the skirt. The casing 30 is then lined with similar insulating material, placed over the pot and attached in the position indicated, as by spot welding, to the upper rim of the pot. Conductors 40 are attached to the terminal posts 24 for supplying current from any source (not shown) to the heating element.

As previously indicated, the filament 16 is preferably constructed of a fragile metal alloy such as a high chrome-iron-aluminum alloy adapted to withstand high temperatures. Likewise the terminal posts 24 are preferably constructed of an alloy of the type of heavy nichrome. The refractory protective sleeves 26 for the joints 22 connecting the ends of the resistor filament with the heavy nichrome terminals are a very important feature of the invention, since it is apparently only by the use of these highly heat conductant and electrically non-conductant protective sleeves of bonded zircon-silicon refractory that a mechanically strong and non-deteriorating joint can be made between such a fragile metal alloy filament and a heavy terminal post of a nichrome or the like. One function of the sleeves 26 is to serve as heat radiating elements for rapid distribution of any heat developed at the joints 22, and thereby provide a relatively cool joint between the nichrome terminal post and the chrome-iron-aluminum wire.

The invention having been thus described, what is claimed as new is:

1. A solder melting pot, comprising a pot shaped metal container for holding the solder, a sheet metal skirt surrounding and conforming to the lower portion of the container and extending downwardly a substantial distance therebelow, an electrical heating unit intimately bonded to the bottom wall of the container within the extended portion of said skirt, said heating element comprising a metallic electric resistance heating filament embedded directly in heat conducting electric insulating refractory material containing a substantial proportion of ferro-silicon, whereby heat produced by said filament is rapidly conducted to the bottom of said container.

2. A solder melting pot as defined by claim 1 in which the ends of said heating filament are fused to metal terminals for supplying electric current to the filament and in which the resulting fused joints are embedded in electrically insulating heat conducting refractory material cast integral with the refractory material in which said filament is embedded.

3. The method of manufacturing an electric heating pot which comprises attaching a sheet metal skirt around the lower portion of a metal container having a bottom and a side wall so that the skirt extends a substantial distance from the bottom of the container, forming a layer of a plastic mixture of refractory material comprising finely divided zircon, a substantial portion of finely divided ferrosilicon and a relatively small portion of phosphoric acid on the bottom of the container within the skirt, placing an electrical resistance heating element on said layer, forming another layer of said plastic refractory material over said heating element and said first-mentioned layer to embed the element, said mixture of refractory material being adapted when baked to provide an electrical insulating refractory of high heat conductivity, and baking said refractory assembly at a temperature sufficient to intimately bond the refractory material as a unit and to unite the refractory material to the container whereby an electrical heating element is bonded directly to the bottom of the container.

JOHN D. MORGAN.
RUSSELL E. LOWE.